2,741,653
METHOD OF ISOLATING NUCLEOPROTEINS

Roman J. Kutsky, Berkeley, Calif., assignor to The Regents of the University of California, Berkeley, Calif.

No Drawing. Application March 19, 1954,
Serial No. 417,508

1 Claim. (Cl. 260—112)

This invention relates to and in general has for its object the provision of a method for producing a synthetic animal tissue culture or medium also valuable as a vitamin-like substance in human and animal nutrition, and constitutes an improvement over the methods of Von Euler and Heller.

More specifically, the object of this invention is the provision of a method for isolating nucleoprotein fractions from animal tissue by precipitation with streptomycin.

PREPARATION OF NUCLEOPROTEIN FRACTION

By way of a specific and detailed example, my method can be conveniently carried out as follows:

Fresh 12-day chick embryos were removed from their membranes and cooled to 0° C. This temperature was maintained throughout the isolation procedure. The embryos were then homogenized in a large Potter homogenizer, stirred one hour with an equal volume of M/8 potassium borate, pH 7.1, and centrifuged 15 minutes at 24,000 G in a fluid-cooled Servall centrifuge. Re-extraction of the residue increased the final yield by about 30 percent. The supernatant was made M/100 in streptomycin sulfate (Lilly) using a M/4 stock solution, pH 7.5, and left undisturbed for two or more hours; the resulting crude nucleoprotein precipitate was centrifuged down at 24,000 G for 10 minutes. To break up the nucleoprotein-streptomycin complex the precipitate was gently homogenized with a M/3 potassium phosphate buffer, pH 7.2, 4 ml. per embryo, yielding a turbid solution. This solution was dialyzed with stirring in ¾-inch Visking tubing for 12 hours against borate, pH 7.1, 120 ml. per embryo, to remove streptomycin, phosphate and materials of low molecular weight. The streptomycin precipitation was repeated in the dialyzed solution with resuspension of the precipitate in phosphate as above. Dialysis with rotation of the sac was continued for 12 hours against two changes of M/3 phosphate buffer, 32 ml. per embryo, in order to break up any residual streptomycin-nucleoprotein complex. The dense dialyzed suspension was then ultracentrifuged one hour at 105,400 G in a Spinco refrigerated ultracentrifuge. The free lipids rose to the surface and were removed with a capillary pipette, leaving a clear, colorless solution containing soluble nucleoproteins above a pellet of cell particulates and insoluble materials. The solution was stir-dialyzed for 24 hours either against one change of distilled water, 120 ml. per embryo, prior to lyophilization or against the same volume of Gey's saline prior to culture operations. This solution, after ultracentrifugation again for an hour at 105,400 G, was clear, colorless and viscous and exhibited a typical nucleoprotein absorption spectrum in the ultraviolet, with maximum at 260 m$\mu$ and a minimum at 243 m$\mu$. Concentration of the nucleoprotein fraction in the clear solution was routinely determined by comparing optical densities at 260 m$\mu$ against a concentration curve based on dry weight measurements.

Although a temperature of 0° C. was maintained throughout the above procedure, it is possible to maintain the temperature within a range of from 0° C. to 8° C.

Since the material is unstable even at low temperatures the operating time should always be kept at a minimum.

Although the optimum pH values have been given at which the various steps of the process should be carried out, there is some leeway in this regard. However, the pH should be maintained within the range of 7.0 to 7.6.

Also it should be noticed that the potassium borate buffer in which the chick embryos are stirred consists of a mixture of potassium borate and boric acid. The potassium phosphate buffer used was a mixture of $K_2HPO_4$ and $KH_2PO_4$.

ISOLATIONS OF NUCLEIC ACID

Nucleic acid from nucleoprotein fraction

A preparation of the nucleoprotein fraction was suspended in a small volume of 1 M NaCl and shaken with an equal volume of 4:1 chloroform:n-butanol. The emulsion was centrifuged at 2000 G for ½ hour and the nucleoprotein pad at the chloroform-saline interface was saved. The nucleoprotein pad was suspended in a small volume of saline, brought to 100° C. for two minutes, cooled and shaken with an equal volume of chloroform:n-butanol for one hour on a Boerner shaker. After being centrifuged ½ hour at 2000 G the aqueous phase containing nucleic acids and proteins was drawn off. The shaking and centrifuging was repeated on the aqueous phase. The aqueous phase was made to 20 percent ethanol and the precipitated proteins were centrifuged off at 2000 G for ½ hour. The supernatant was adjusted to 67 percent ethanol and the crude nucleic acid precipitate formed was centrifuged off and redissolved in a small amount of distilled water. Precipitations at 20 percent and 67 percent ethanol were repeated as before and the 67 percent precipitate (nucleic acid) was washed in alcohol and ether and dried in vacuo. An intermediate state of polymerization would be expected to result from this procedure. No protein tests were made on the final product. The product was reconstituted with Gey's solution to form a slightly viscous solution before being placed in culture. The ultraviolet spectrum was very similar to that of the high-polymer nucleic acid described below.

High-polymer nucleic acid

The method of Nishioka and Ibuka (1952) requires that the temperature be maintained at 0° C. throughout the procedure. Fresh 11-day chick embryos were homogenized and then extracted with 1½ volumes of physiological saline solution. Nucleo-proteins were precipitated from the centrifuged extract by lowering the pH to 4.2, sedimented at 3000 G for ½ hour, and resuspended in 1½ volumes of saline at pH 7.0. The solution was made 3 M in NaCl by adding crystalline NaCl, and allowed to stand 48 hours. Some of the proteins were precipitated at pH 4.2 and centrifugally removed and 3 volumes of 95 percent ethanol were added to the supernatant. The nucleic acid-protein precipitate was centrifuged down at 3000 G for ½ hour and resuspended in physiological saline at pH 7.0. This suspension was shaken with 2½:1 chloroform:amyl alcohol, the emulsion centrifuged, and the aqueous phase drawn off. This shaking process was repeated until the aqueous layer showed a negative biuret test for proteins. Three volumes of 95 percent alcohol were added to the final aqueous layer, the resulting nucleic acid precipitate was centrifuged off, washed in alcohol and ether, and dried in vacuo. This product was reconstituted either in Gey's solution prior to culturing or in distilled water prior to relative-viscosity determinations in an Ostwald viscosimeter. The viscosity found was very close to that given by Katsuta and Takaoka, namely 2.4. The ultraviolet absorption spectrum resembles that of a nucleic acid with a typical maximum at 258 m$\mu$.

ANALYTICAL METHODS AND RESULTS

Electrophoretic technique

Preliminary electrophoretic analyses were run, using the Klett analytical electrophoresis apparatus. This apparatus was equipped with a schlieren optical scanning apparatus and special compensating devices. An 11 cc. cell, 3 mm. by 25 mm. cross section, with two sliding horizontal sections, was used in a water bath maintained at 1.8° C. Sterile technique was maintained throughout the electrophoretic separations. An exploratory run was followed by two preparatory runs as follows: The first run was made in 0.02 M phosphate buffer, pH 7.2, at a concentration of 0.4 gm./100 cc. of nucleoprotein fraction, with current at 10 milliamperes and field strength at 10 volts/cm. The second run was made with the same buffer, 0.92 gm./100 cc. of nucleoprotein fraction, current 13 milliamperes and field strength as before. After running 6 to 8 hours, the current was turned off, each cell section isolated by horizontal displacement relative to adjoining sections, and subfractions removed. These were drawn off with a capillary pipette at vertical distances along the cell lumen corresponding to the location of the peaks as measured in the optical patterns. Because of the small volume of some components it was advisable to remove these in combination with an adjoining fraction. The component nearest the parent material could not be separated, owing to admixture with the parent fraction. The ultraviolet absorption spectrum of each isolated subfraction was determined before testing in culture. In general, four components were found: two successive small and fast leading components were followed by a large component, followed by a small component. Ultraviolet spectra in the order mentioned resembled two nucleic acids with absorption maxima at the typical nucleic acid maximum at 260 m$\mu$, next a nucleoprotein with a maximum at 260 m$\mu$ and a typical nucleoprotein curve similar to the parent nucleoprotein fraction, and lastly a component without an absorption maximum at 260 m$\mu$.

Protein tests

Qualitative tests for the presence of protein were made using the biuret test (Hawk, Oser, and Summerson, 1949) and the more sensitive Sakaguchi test (Sakaguchi, 1925). The biuret test was made by mixing one drop of solution to be tested with a drop of 40 percent NaOH-CuSO$_4$ reagent, a positive test for protein being the formation of a violet color. The Sakaguchi test was performed by adding one drop of 40 percent NaOH to ½ ml. of test fraction, followed by one drop of 0.1 percent alpha naphthol in 70 percent alcohol and one drop of 5 percent sodium hypochlorite. A resulting red color indicated a positive test for protein. Both tests gave positive results on the nucleoprotein fraction, while the high-polymer nucleic acid isolated according to Nishioka and Ibuka (1952) gave a negative biuret but a positive Sakaguchi test.

Nucleic acid analyses

Quantitative analyses for nucleic acids in the nucleoprotein fraction were made as follows: the method of Schmidt and Thannhauser (1945) employing an incubation in 1 N NaOH for 18 hours at 37° C. was used to separate both RNA and DNA from the nucleo-protein fraction. To precipitate out the DNA plus the soluble proteins, 5 percent trichloroacetic acid (cold) was added and the precipitate was centrifuged down. The supernatant containing RNA was saved for analysis. The DNA in the precipitate was solubilized using Schneider's technique (1945), which employs a 5 percent trichloroacetic acid extraction at 90° C. for 15 minutes. The protein remains insoluble and is centrifuged off. Analysis for RNA in the supernatant from the first extraction was made using a modification of Mejbaum (1939): one ml. of a sample was mixed with 1½ ml. of 0.1 percent FeCl$_3$ in concentrated HCl and containing 0.3 percent orcinol. The mixture was heated in a boiling water bath 20 minutes, cooled and made up to 3 ml., and the absorption at 660 m$\mu$ was determined in a Beckman spectrophotometer using appropriate reagent blanks. The RNA concentration was determined from a standard curve made with known quantities of RNA. Using Stumpf's method (1947), DNA in the second supernatant was determined as follows: a ½-ml. sample was mixed with 0.05 ml. of 5 percent cysteine hydrochloride followed by 5 ml. of 70 percent H$_2$SO$_4$. After being mixed, then standing ten minutes, samples were read at 490 m$\mu$ using appropriate reagent blanks. The concentration of DNA was determined from a standard curve made with known quantities of chick erythrocyte DNA.

Test for streptomycin

A test to determine streptomycin in the nucleoprotein fraction was based on the observation that streptomycin or a derivative of it is released from combination with the nucleoprotein fraction by incubating in 1 N NaOH for 18 hours at 37° C. A similar assay method was later found to have been proposed by Waksman (1947). Streptomycin has an absorption maximum at 325 m$\mu$ which is enhanced some 200 times by incubation with alkali. The alkaline incubation breaks down the streptomycin to form maltol (Waksman, 1947), which has an absorption maximum very close to 325 m$\mu$. The nucleoprotein fraction alone has a very low, steadily decreasing absorption in this region. Thus by incubating a sample of nucleoprotein fraction with alkali and determining the absorption at 325 m$\mu$, one can estimate concentrations of streptomycin from a standard curve made with known quantities of alkali-incubated streptomycin. Very little, if any, streptomycin could be detected in the final product of the nucleoprotein fraction; i. e., any amount present was at the lower limit of sensitivity of this method.

Test for heme-type proteins

A test for contaminating proteins similar to heme proteins in the nucleoprotein fraction was based on the general presence of a reddish color and of an absorption maximum at 405 m$\mu$ in heme proteins. Crude nucleoprotein fraction was reddish in color and possessed an absorption maximum at 405 m$\mu$. The final nucleoprotein fraction was colorless, and possessed no absorption maximum at 405 m$\mu$, within limits of sensitivity of the method. Hence, there was probably very little, if any, heme protein present.

The nucleoprotein product resulting from the isolation process of this invention, in addition to being valuable as a synthetic culture medium and as a vitamin-like substance in human and animal nutrition, appears to have possible applications as a pharmaceutical product for the restoration of growth potentiality to tissues damaged by radiation and other causes.

I claim:

In a method for isolating nucleoproteins, the steps consisting of cooling homogenized animal embryonic tissue to from 0° to 8° C., adding thereto about an equal volume of about ⅛ M potassium borate at a pH value of about 7.1, stirring for about one hour, centrifuging for about 15 minutes at about 24,000 G, decanting off the supernatant solution from the residue, adding about an equal volume of about ⅛ M potassium borate at a pH value of about 7.1 to the residue, stirring for about one hour, centrifuging for about 15 minutes at about 24,000 G, decanting off the supernatant solution, combining the supernatant solutions from both centrifugations, making the combined solutions about .01 M in streptomycin sulfate at a pH value of about 7.5, allowing the solution to settle for more than two hours, separating the resultant precipitate from the solution by centrifuging at about 24,000 G for about 10 minutes, homogenizing the precipitate in about ⅓ M potassium phosphate at a pH value of about 7.2, dialyzing the homogenate through sheet cellulose against about ⅛ M potassium borate solution at a pH value of about 7.1, making the residual solution about 0.01 M in streptomycin sulfate at a pH value of about 7.1, separating the resultant precipitate, homogenizing the precipitate in about ⅓ M potassium phosphate at a pH value of about 7.2, dialyzing the homogenized solution against about ⅓ M potassium phosphate, ultracentrifuging the dialyzed solution at greater than 100,000 G, skimming the separated lipids from the surface of the solution, separating the supernatant liquor from the residue, dialyzing the separated liquor against a physiological saline solution, ultracentrifuging the residual solution from the dialysis at greater than 100,000 G, and decanting the resulting nucleoprotein solution from the residue; a temperature of from 0° C. to 8° C. being maintained throughout the entire process.

References Cited in the file of this patent

Cohen: J. Biol. Chem., vol. 166, pp. 393–4 (1946).
Cohen: J. Biol. Chem., vol. 168, pp. 511–26 (1947).
Euler et al.: Chem. Abst., vol. 43, col. 1069 (1949).
Rybak et al.: Chem. Abst., vol. 45, col. 209 (1951).
Euler et al.: Chem. Abst., vol. 44, col. 8990–1 (1930).
Kurylowicz et al.: Chem. Abst., vol. 45, col. 7637 (1951).